United States Patent
Day

(10) Patent No.: US 11,108,119 B2
(45) Date of Patent: Aug. 31, 2021

(54) FUSIBLE LINK DESIGN FOR LITHIUM-ION 18650 CELLS

(71) Applicant: The Boeing Company, Chicago, IL (US)

(72) Inventor: Greg R. Day, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 200 days.

(21) Appl. No.: 16/172,226

(22) Filed: Oct. 26, 2018

(65) Prior Publication Data
US 2020/0136124 A1 Apr. 30, 2020

(51) Int. Cl.
*H01H 85/143* (2006.01)
*H01M 50/581* (2021.01)
*H01H 85/02* (2006.01)
*H01M 10/0525* (2010.01)
*H01H 85/20* (2006.01)

(52) U.S. Cl.
CPC ...... *H01M 50/581* (2021.01); *H01H 85/0241* (2013.01); *H01H 85/143* (2013.01); *H01H 85/205* (2013.01); *H01M 10/0525* (2013.01); *H01M 2200/103* (2013.01)

(58) Field of Classification Search
CPC .. H01H 85/0241; H01H 85/055; H01H 85/06; H01H 85/08; H01H 85/10; H01H 85/12; H01H 85/143; H01H 85/205; H01H 2085/0555; H01M 2/348; H01M 10/0525; H01M 2200/103
See application file for complete search history.

(56) References Cited

U.S. PATENT DOCUMENTS

| | | | |
|---|---|---|---|
| 2013/0202941 A1* | 8/2013 | Ono | H01M 2/34 429/121 |
| 2013/0337299 A1* | 12/2013 | Sugawara | H01M 10/425 429/61 |
| 2015/0050531 A1* | 2/2015 | Felser | H01M 2/204 429/61 |
| 2016/0073506 A1* | 3/2016 | Coakley | H05K 1/189 156/60 |
| 2017/0077487 A1* | 3/2017 | Coakley | H05K 1/118 |
| 2017/0141379 A1* | 5/2017 | Biskup | H01H 85/055 |
| 2017/0214033 A1* | 7/2017 | Takano | H01M 10/0525 |
| 2017/0229208 A1* | 8/2017 | Kovent | H01M 10/6561 |
| 2018/0261804 A1* | 9/2018 | Bayles | H01M 10/6571 |
| 2018/0366711 A1* | 12/2018 | Igarashi | H01M 2/348 |

* cited by examiner

*Primary Examiner* — Jacob R Crum
(74) *Attorney, Agent, or Firm* — Coats & Bennett, PLLC

(57) ABSTRACT

Aspects disclosed herein provide a fusible link system and/or method configured to protect an electrical system/circuit, e.g., a battery comprising a plurality of cells, from a current overload. To that end, the fusible link system comprises a conductive substrate and one or more first terminals that electrically connected to the conductive substrate. Each of the one or more first terminals comprises one or more structural properties configured to maintain an electrical connection with the conductive substrate when a current load on the first terminal is less than a predetermined maximum and sever the electrical connection with the conductive substrate when the current load on the first terminal equals or exceeds the predetermined maximum.

20 Claims, 9 Drawing Sheets

FUSIBLE LINK DESIGN FOR LITHIUM-ION 18650 CELLS

TECHNOLOGICAL FIELD

The present disclosure relates generally to current overload protection, and more particularly to protecting a battery from current overload using a fusible link system.

BACKGROUND

During normal operation, electronic systems function as configured, providing the appropriate output, e.g., current, voltage, signal, etc., based on the system design. However, current overloads may occur in some circumstances, e.g., due to a power surge, a short circuit, component failure, etc. Left unchecked, such current overloads may damage the electrical system and/or components/systems connected to the output of the electrical system. Thus, electrical systems may be designed with current overload protection.

Batteries comprising multiple interconnected cells represent one exemplary electrical system in need of current overload protection. In particular, when the battery experiences a current overload, it is important to isolate the impacted cell(s) within the battery from the rest of the cells. Conventional solutions to this problem include using fuses for each cell or string of cells to electrically isolate each cell or string of cells. The use of fuses, however, leads to higher manufacturing times for installation and undesirably high procurement costs.

As such, there remains a need for improved current overload protection for electrical systems, including but not limited to multi-cell batteries.

SUMMARY

According to aspects of the present disclosure, apparatuses, systems, and methods are presented for providing a fusible link system to protect electronic systems, e.g., a battery comprising a plurality of cells, from a current overload.

According to the present disclosure, a fusible link system comprises a conductive substrate and one or more first terminals that electrically connected to the conductive substrate. Each of the one or more first terminals comprises one or more structural properties configured to maintain an electrical connection with the conductive substrate when a current load on the first terminal is less than a predetermined maximum and sever the electrical connection with the conductive substrate when the current load on the first terminal equals or exceeds the predetermined maximum.

According to a further aspect, the conductive substrate further comprises one or more conductors spaced from the conductive substrate and each corresponding to one of the one or more first terminals. For each of the one or more conductors, a first end of the corresponding first terminal is electrically connected to the conductor, and a second opposing end of the corresponding first terminal is electrically connected to the conductive substrate.

According to a further aspect, the fusible link system further comprises one or more second terminals electrically connected to the conductive substrate and associated with a corresponding one of the one or more conductors. Each of the one or more second terminals is spaced from the first terminal of the corresponding conductor, a first end of the second terminal is electrically connected to the corresponding conductor, and a second opposing end of the second terminal is electrically connected to the conductive substrate. Each of the one or more second terminals comprises one or more structural properties configured to maintain the electrical connection with the conductive substrate when the current load on the second terminal is less than the predetermined maximum, and sever the electrical connection with the conductive substrate when the current load on the second terminal equals or exceeds the predetermined maximum.

According to a further aspect, for each of the one or more first terminals, the first terminal is disposed between the corresponding conductor and the conductive substrate such that the first end of the first terminal electrically connects to a first portion of the periphery of the corresponding conductor, and the second opposing end of the first terminal electrically connects to a first portion of the conductive substrate. Further, for each of the one or more second terminals, the second terminal is disposed between the corresponding conductor and the conductive substrate such that the first end of the second terminal electrically connects to a second portion of the periphery of the corresponding conductor opposite the first portion, and the second opposing end of the second terminal electrically connects to a second portion of the conductive substrate opposite the first portion of the conductive substrate.

According to a further aspect, for each of the one or more first and second terminals, the first terminal is disposed between the corresponding conductor and the conductive substrate such that the first end of the first terminal electrically connects to a first portion of the periphery of the corresponding conductor and the second opposing end of the first terminal electrically connects to a first portion of the conductive substrate, and the second terminal is disposed between the corresponding conductor and the conductive substrate and proximate the corresponding first terminal such that the first end of the second terminal electrically connects to the first portion of the periphery of the corresponding conductor proximate the first end of the first terminal and the second opposing end of the second terminal is electrically connected to the first portion of the conductive substrate proximate the second opposing end of the first terminal.

According to a further aspect, the one or more structural properties of each first terminal and each second terminal comprise a material and/or a length and/or a width and/or a thickness.

According to a further aspect, the conductive substrate comprises a plurality of openings. One of the one or more conductors is disposed within a corresponding one of the plurality of openings and spaced from the periphery of the corresponding opening, and the opposing end of the corresponding one of the one or more first terminals is electrically connected to the periphery of the corresponding one of the plurality of openings.

According to a further aspect, the fusible link system further comprises one or more second terminals electrically connected to the conductive substrate and each corresponding to one of the one or more conductors. Each of the one or more second terminals is spaced from a corresponding one of the one or more first terminals, a first end of the second terminal is electrically connected to the corresponding conductor, and a second opposing end of the second terminal is electrically connected to the periphery of the corresponding one of the plurality of openings. Each of the one or more second terminals comprises one or more structural properties configured to maintain the electrical connection with the conductive substrate when the current load on the second terminal is less than the predetermined maximum, and sever the electrical connection with the conductive substrate when the current load on the second terminal equals or exceeds the predetermined maximum.

According to a further aspect, the plurality of openings comprises a plurality of openings arranged in an orderly array in the conductive substrate.

According to a further aspect, each of the plurality of openings has a rounded rectangular shape having a central length $L_o$, a central width $W_o$ less than the central length $L_o$, and an arc radius R for side portions of the periphery at opposing ends of the central length $L_o$, and each of the one or more conductors has a circular shape comprising a diameter D less than the central width $W_o$ of the corresponding opening.

According to a further aspect, the central length $L_o$ of each of the plurality of openings is greater than twice the diameter D of the corresponding conductor, and the arc radius R of each opening is greater than half the diameter D of the corresponding conductor.

According to a further aspect, the one or more structural properties of each first terminal comprise a material and/or a length and/or a width and/or a thickness.

The present disclosure further discloses a method of protecting a battery comprising a plurality of cells from a current overload. The method comprises aligning a fusible link system with the battery to align a first contact of a corresponding one of the plurality of cells with a corresponding first terminal of the fusible link system. The fusible link system comprises a conductive substrate and one or more first terminals electrically connected to the conductive substrate. The method further comprises electrically connecting each of one or more first terminals to the first contact of a corresponding one of the plurality of cells. Each of the one or more first terminals comprises one or more structural properties configured to maintain the electrical connection with the conductive substrate when a current load on the first terminal is less than a predetermined maximum, and sever the electrical connection with the conductive substrate when the current load on the first terminal equals or exceeds the predetermined maximum.

According to a further aspect, the conductive substrate further comprises one or more conductors spaced from the conductive substrate and electrically connected to the first contact of the corresponding one of the plurality of cells. Electrically connecting each of the one or more first terminals comprises electrically connecting a first end of a corresponding one of the one or more first terminals to a corresponding one of the one or more conductors, where a second opposing end of the corresponding one of the one or more first terminals is electrically connected to the conductive substrate.

According to a further aspect, the fusible link system further comprises one or more second terminals, each electrically connected to the conductive substrate and each spaced from a corresponding one of the one or more first terminals. The method further comprises electrically connecting each of the one or more second terminals to the first contact of the corresponding one of the plurality of cells by electrically connecting a first end of the second terminal to the corresponding conductor, wherein a second opposing end electrically connects to the conductive substrate. Each of the one or more second terminals comprises one or more structural properties configured to maintain the electrical connection with the conductive substrate when the current load on the second terminal is less than the predetermined maximum, and sever the electrical connection with the conductive substrate when the current load on the second terminal equals or exceeds the predetermined maximum.

According to a further aspect, electrically connecting the first terminals to the corresponding conductor comprises electrically connecting a first end of the first terminal to a first portion of the periphery of the corresponding conductor and the second opposing end of the first terminal is electrically connected to a first portion of the conductive substrate. Further, electrically connecting the second terminals to the corresponding conductor comprises electrically connecting the first end of the second terminal to a second portion of the periphery of the corresponding conductor opposite the first portion of the periphery of the corresponding conductor and the second opposing end of the second terminal is electrically connected to a second portion of the conductive substrate opposite the first portion of the conductive substrate.

According to a further aspect, electrically connecting the first terminals to the corresponding conductor comprises electrically the connecting the first end of the first terminal to a first portion of the periphery of the corresponding conductor, and second the opposing end of the first terminal is electrically connected to a first portion of the conductive substrate. Further, electrically connecting the second terminals to the corresponding conductor comprises electrically connecting the first end of the second terminal to the first portion of the periphery of the corresponding conductor proximate the first end of the first terminal, and the second opposing end of the second terminal is electrically connected to the first portion of the conductive substrate proximate the opposing end of the first terminal.

According to a further aspect, the conductive substrate comprises a plurality of openings, and one of the one or more conductors is disposed within a corresponding one of the plurality of openings and spaced from the periphery of the corresponding opening. Electrically connecting each of the one or more first terminals further comprises electrically connecting the opposing end of the corresponding one of the one or more first terminals to a periphery of the corresponding opening.

According to a further aspect, the fusible link system further comprises or more second terminals, each electrically connected to the conductive substrate and each spaced from a corresponding one of the one or more first terminals. The method further comprises electrically connecting a first end of each of the one or more second terminals to the corresponding conductor. A second opposing end of each of the one or more second terminals is electrically connected to the periphery of the corresponding opening. Each of the one or more second terminals comprises one or more structural properties configured to maintain the electrical connection with the conductive substrate when the current load on the second terminal is less than the predetermined maximum, and sever the electrical connection with the conductive substrate when the current load on the second terminal equals or exceeds the predetermined maximum.

According to a further aspect, the method further comprises configuring the plurality of openings such that each of the plurality of openings has a rounded rectangular shape having a central length $L_o$, a central width $W_o$ less than the central length $L_o$, and an arc radius R for side portions of the periphery at opposing ends of the central length $L_o$. Each of the one or more conductors has a circular shape comprising a diameter D. The central width $W_o$ of each of the plurality of openings is greater than the diameter D of the corresponding conductor. The central length $L_o$ of each of the plurality of openings is greater than twice the diameter D of the corresponding conductor. The arc radius R of each opening is greater than half the diameter D of the corresponding conductor.

The features, functions and advantages that have been discussed can be achieved independently in various aspects or may be combined in yet other aspects further details of which can be seen with reference to the following description and the drawings.

BRIEF DESCRIPTION OF THE DRAWINGS

Figure 1:
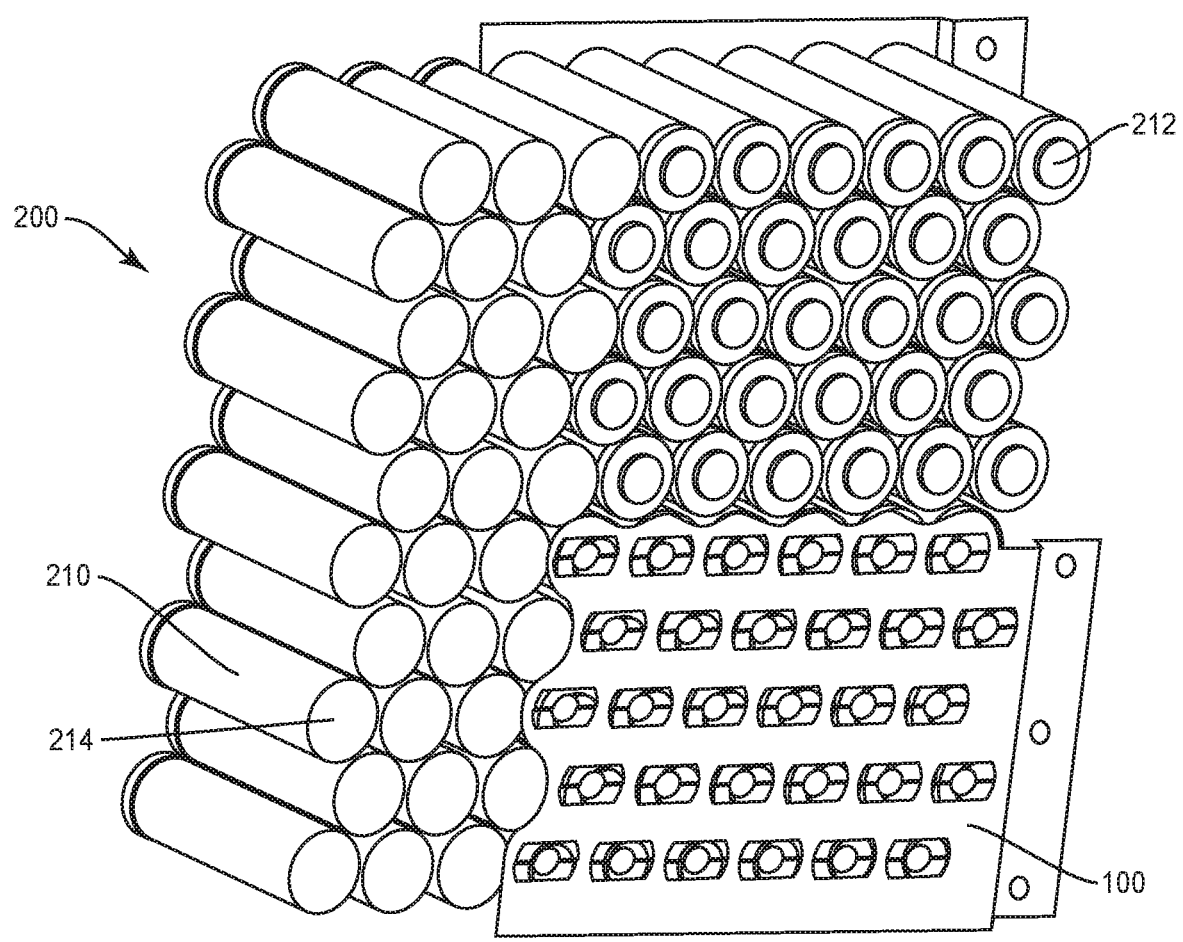

Having thus described variations of the disclosure in general terms, reference will now be made to the accompanying drawings, which are not necessarily drawn to scale, and wherein:

FIG. 1 shows an exemplary battery comprising multiple cells coupled to a fusible link system according to aspects disclosed herein.

Figure 2:
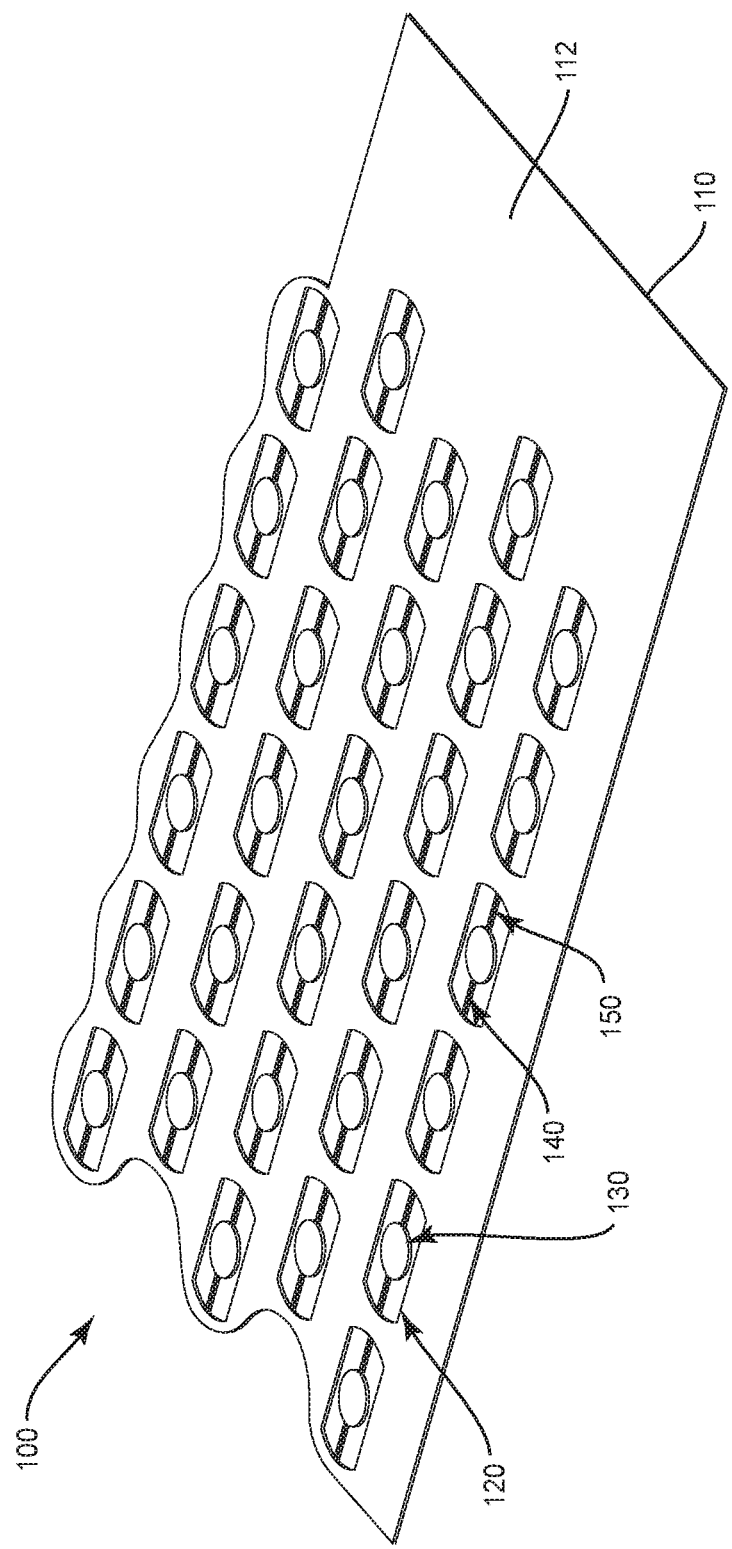

FIG. 2 shows an exemplary fusible link system according to aspects disclosed herein.

Figure 3A:
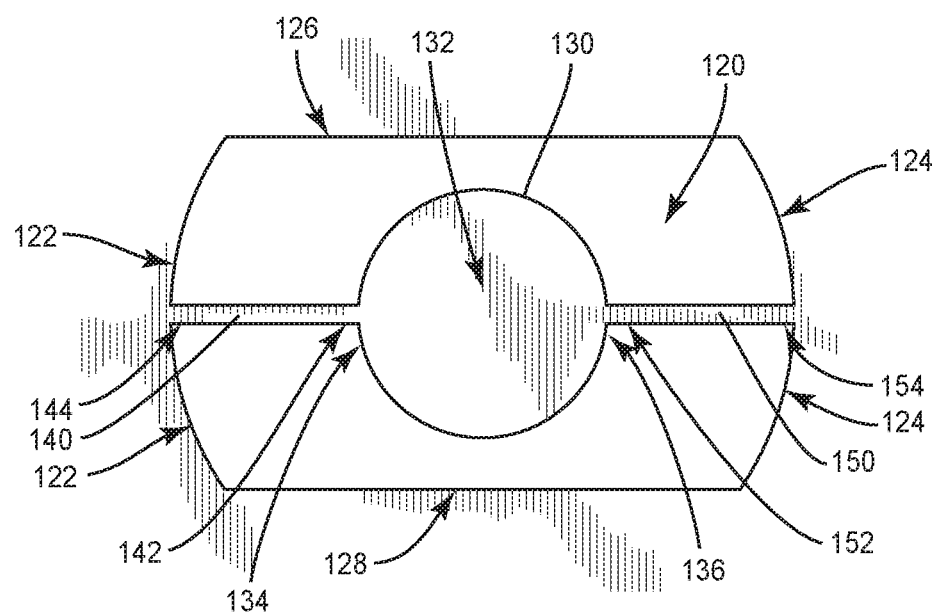
Figure 3B:
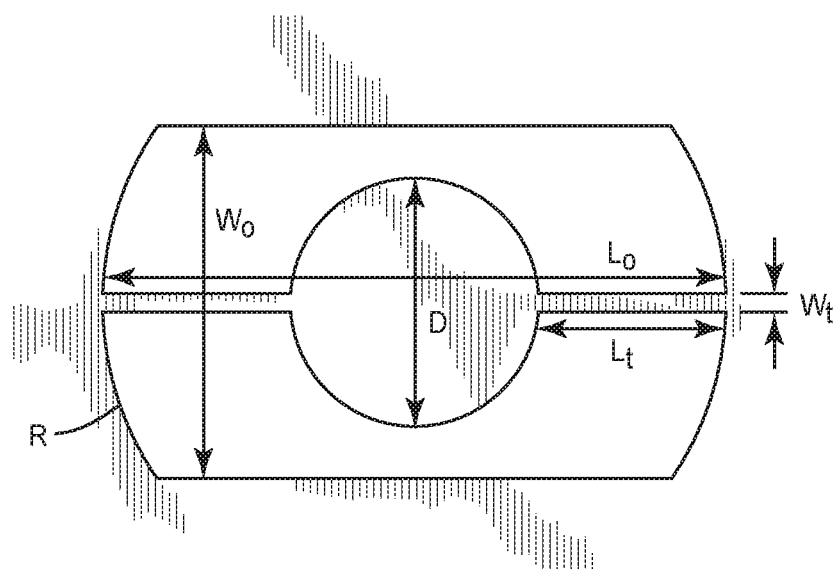

FIGS. 3A and 3B show an exemplary opening for the fusible link system of FIG. 2 according to aspects disclosed herein.

Figure 4A:
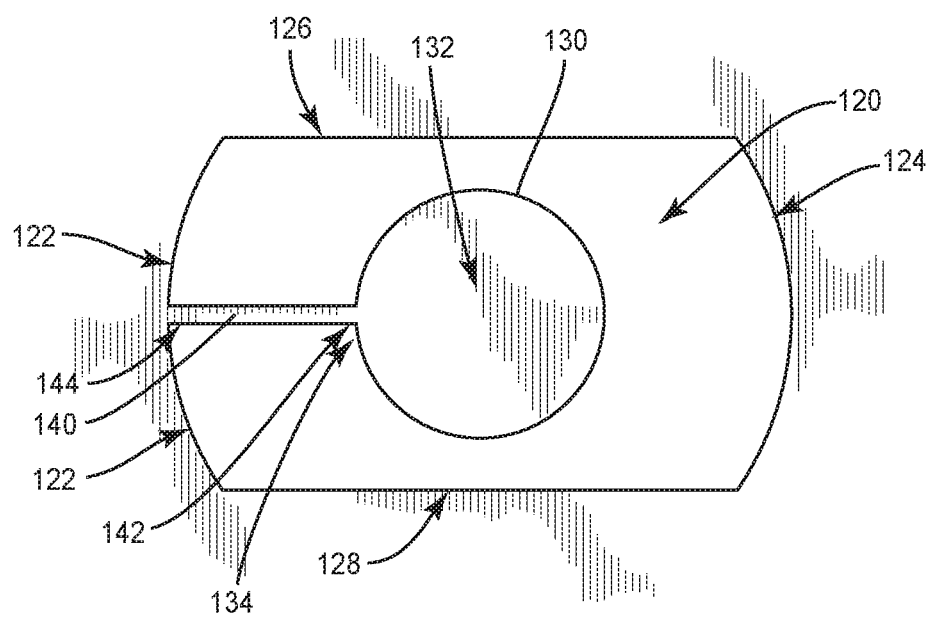
Figure 4B:
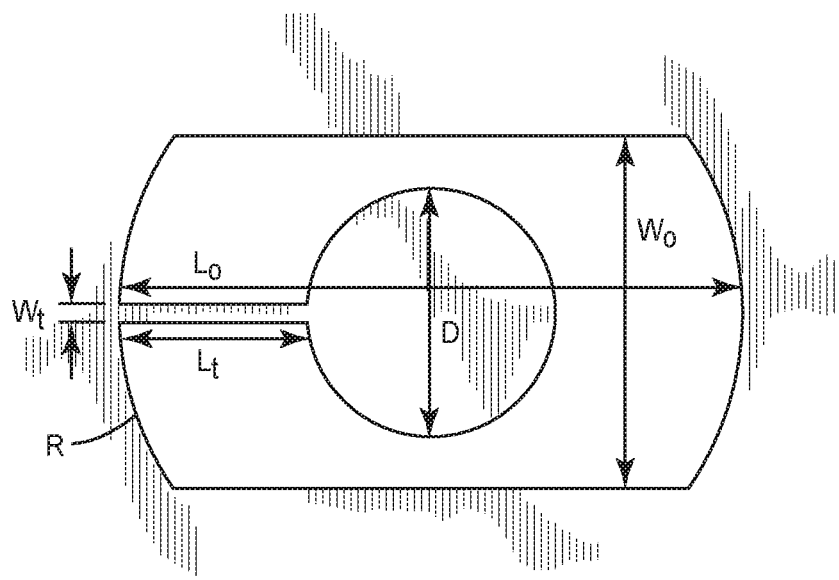

FIGS. 4A and 4B show another exemplary opening for the fusible link system of FIG. 2 according to aspects disclosed herein.

Figure 5A:
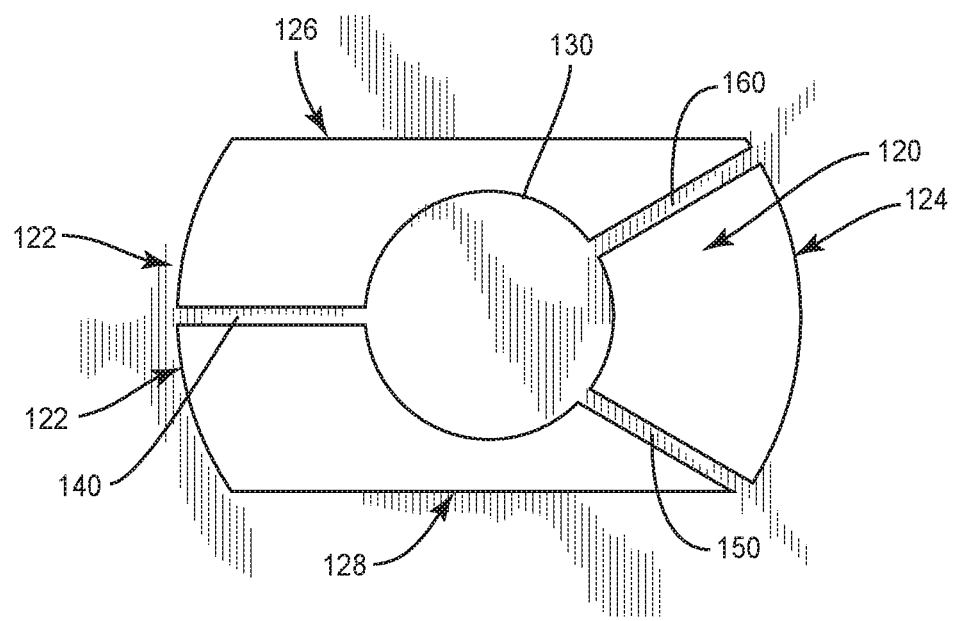
Figure 5B:
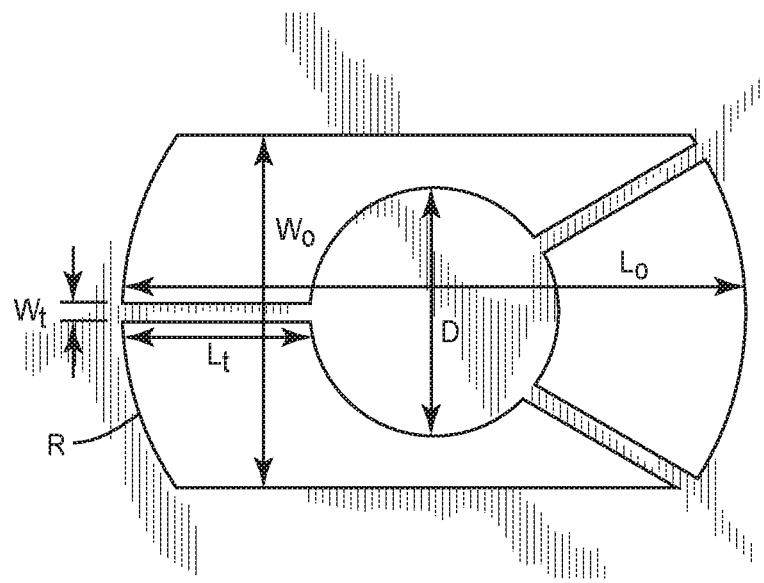

FIGS. 5A and 5B show another exemplary opening for the fusible link system of FIG. 2 according to aspects disclosed herein.

Figure 6A:
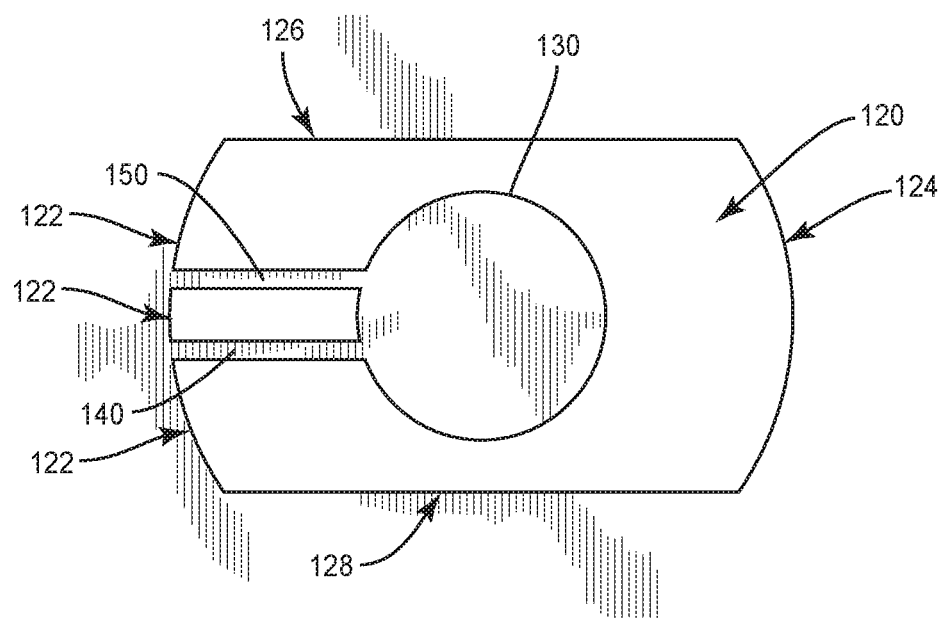
Figure 6B:
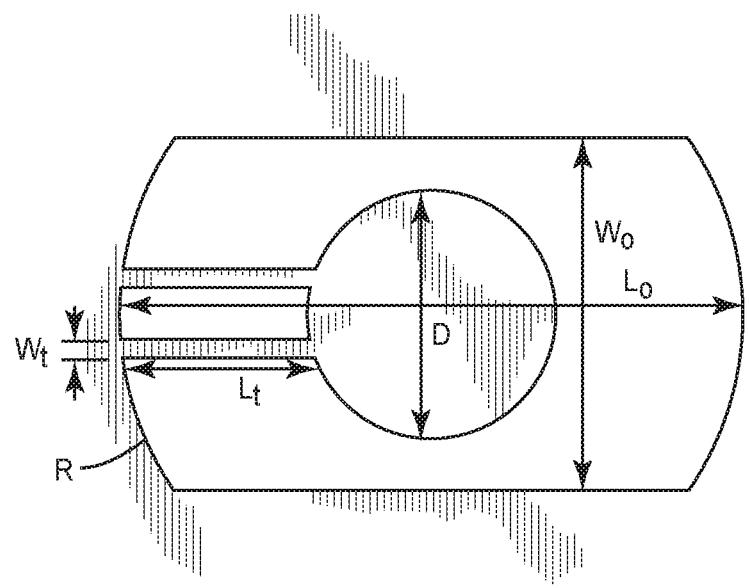

FIGS. 6A and 6B show another exemplary opening for the fusible link system of FIG. 2 according to aspects disclosed herein.

Figure 7:
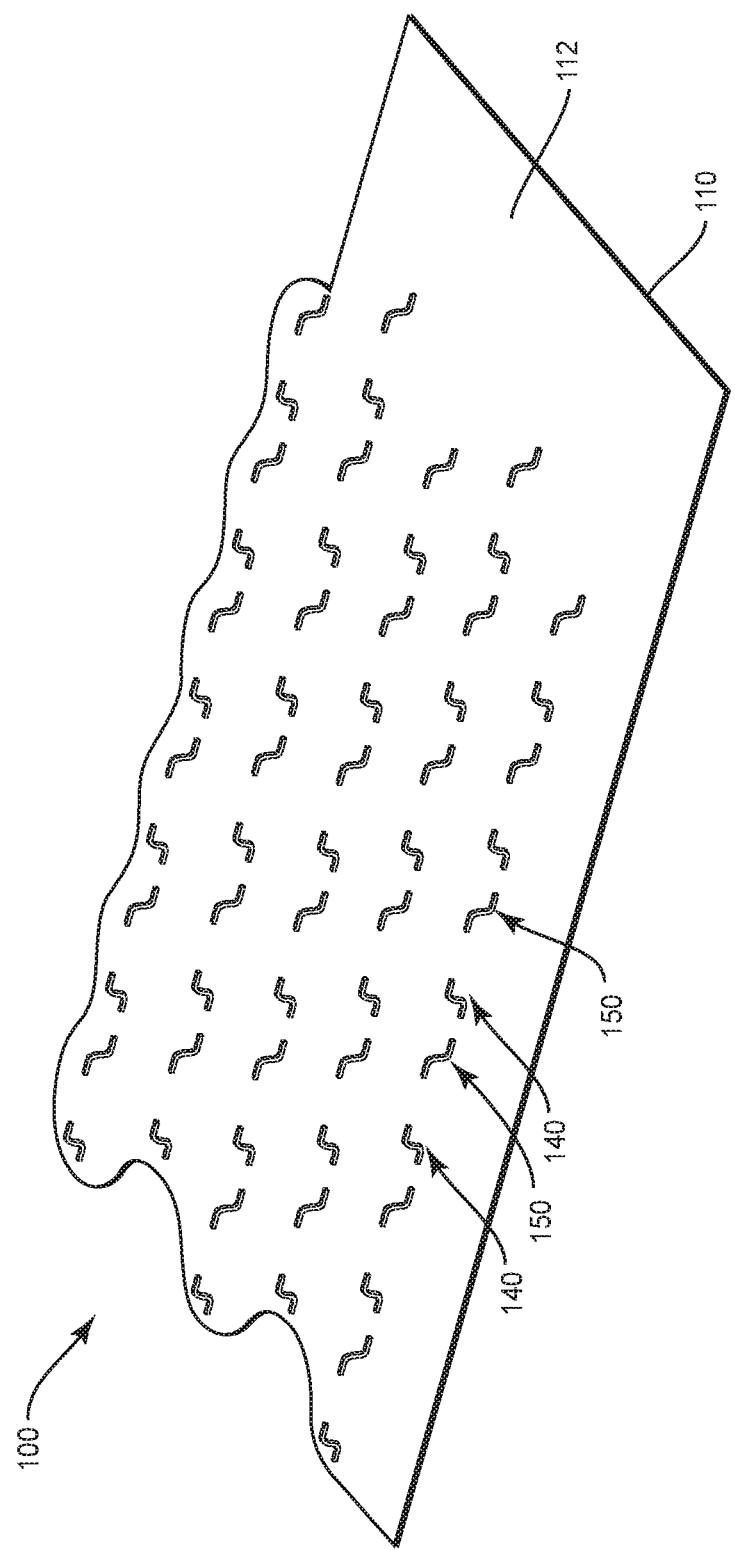

FIG. 7 shows an exemplary fusible link system according to further aspects disclosed herein.

Figure 8:
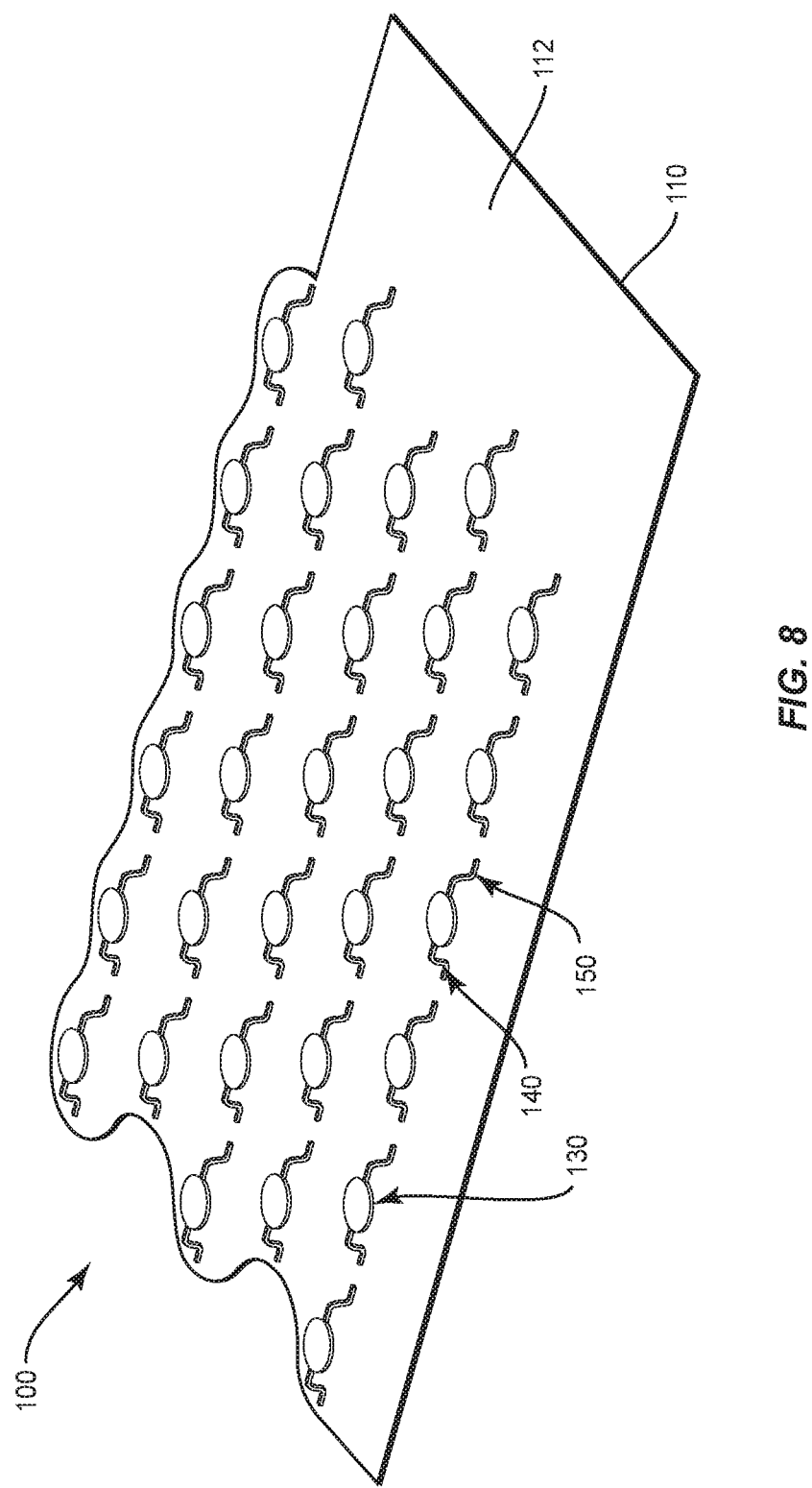

FIG. 8 shows an exemplary fusible link system according to further aspects disclosed herein.

Figure 9:
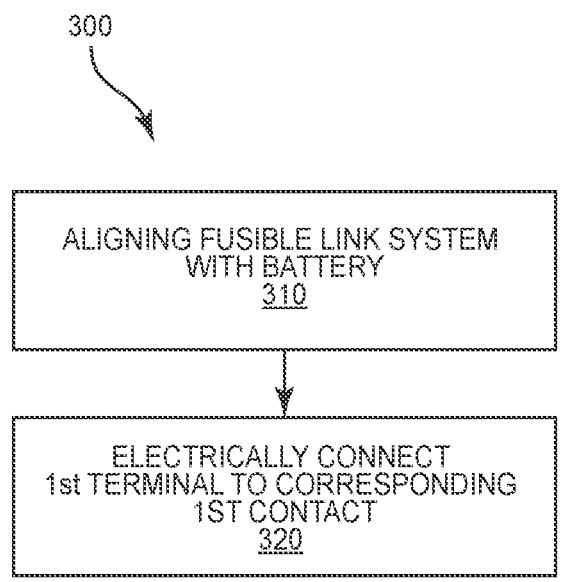

FIG. 9 shows an exemplary method of protecting a batter comprising a plurality of cells according to aspects disclosed herein.

DETAILED DESCRIPTION

Aspects presented herein provide a fusible link system configured to protect an electronic system, e.g., a battery, from current overload. While the aspects disclosed herein are presented in terms of protecting a battery comprising multiple cells arranged in an orderly array, it will be appreciated that the fusible link system presented herein may be used to protect any arrangement of battery cells and/or any electrical system, including non-battery electrical systems. As such, the following details are provided for illustration purposes.

FIG. 1 shows a fusible link system 100 operatively connected to a battery 200 comprising a plurality of cells 210, e.g., lithium ion cells. Each cell of the cells 210 has a positive contact 212 and a negative contact 214. The fusible link system 100 connects to one contact 212, 214 of each cell 210. In one exemplary aspect, the fusible link system 100 connects to the positive contact 212 of each cell 210.

FIG. 2 shows a fusible link system 100 according to one exemplary aspect. As shown in FIG. 2, the fusible link system 100 comprises a conductive substrate 110, where the conductive substrate 110 includes a plurality of openings 120 arranged in an orderly array. Each opening 120 includes a conductor 130 spaced from the periphery of the opening 120, e.g., disposed in the middle of the opening 120, as well as a first terminal 140 and a second terminal 150 spaced from the first terminal 140. Each of the first and second terminals 140, 150 comprise one or more structural properties such that the first and second terminals 140, 150 maintain an electrical connection with the conductive substrate 110 when a current load on the first terminal 140 and/or second terminal 150 is less than a predetermined maximum, and sever the electrical connection with the conductive substrate 110 when the current load on the first terminal 140 and/or second terminal 150 exceeds the predetermined maximum. While exemplary aspects configure the first and second terminals 140, 150 with the same structural properties, it will be appreciated that such is not required.

FIGS. 3A and 3B show an example of one of the openings 120 of the fusible link system 100 of FIG. 2 to better illustrate details of the opening 120, conductor 130, first terminal 140, and second terminal 150. In the exemplary aspect of FIGS. 3A and 3B, the first and second terminals 140, 150 are disposed within the opening 120 on opposing sides of the conductor 130. The opening 120 is defined by a periphery comprising a left periphery 122, a right periphery 124, a top periphery 126, and a bottom periphery 128. It will be appreciated that the left periphery 122 spans the distance between the top periphery 126 and the bottom periphery 128 on the left side of the opening 120, and that the right periphery 124 spans the distance between the top periphery 126 and the bottom periphery 128 on the right side of the opening 120 opposite the left side of the opening 120. A first end 142 of the first terminal 140 electrically connects to a first peripheral side 134 of the conductor 130, while a second opposing end 144 of the first terminal 140 electrically connects to the conductive substrate 110, e.g., at the left periphery 122 of the opening 120. Similarly, a first end 152 of the second terminal 150 electrically connects to a second peripheral side 136 of the conductor 130, while a second opposing end 154 of the second terminal 150 electrically connects to the conductive substrate 110, e.g., at the right periphery 124 of the opening 120. As shown in FIG. 3A, the first and second peripheral sides 134, 136 of the conductor 130 represent opposing peripheral sides of the conductor 130. It will be appreciated that while embodiments are described herein as having the first ends 142, 152 connect to a peripheral side 134, 136 of the conductor 130, the first ends 142, 152 may connect to any portion of the conductor 130. Further, it will be appreciated that while embodiments are described herein as having the second ends 144, 154 connect to the left/right periphery 122, 124, the second ends 144, 154 may connect to any suitable portion of the conductive substrate 110.

A surface 132 of the conductor 130 is configured to electrically connect to the corresponding positive contact 212 or negative contact 214 of a particular cell 210 of the battery 200. In some exemplary aspects, surface 132 fixedly connects to the corresponding contact 212, 214 of the corresponding cell 210, e.g., via solder or some other conductive epoxy adhesive. In other exemplary aspects, surface 132 comprises a removable connector, e.g., a snap-on cap, that removably connects to the corresponding contact 212, 214 of the corresponding cell 210.

The conductor 130 is disposed in the opening 120 but spaced from the periphery 122, 124, 126, 128 of the opening. As such, the opening 120 is configured to be larger than the conductor 130. In exemplary aspects, the opening 120 comprises a rounded rectangular shape having a central length $L_o$, a central width $W_o$, and an arc radius R on opposing ends of the central length, the conductor 130 comprises a rounded shape with a diameter D, and the terminals 140, 150 each comprise a narrow rectangular shape having a length $L_t$ and a width $W_t$. As shown in FIG. 3B, $W_o<L_o$, $W_o>D$, $L_o>2L_t$, $L_o=2L_t+D$, and $R>\frac{1}{2}D$. In some exemplary aspects, $L_o>2D$. One exemplary fusible link system 100 comprises openings 120, conductors 130, and terminals 140, 150 with the following dimensions: $W_o=0.365"$, $L_o=0.66"$, $R=0.33"$, $L_t=0.200"$, $W_t32$ 0.025", and D=0.26".

Each of the terminals 140, 150 comprises one or more structural properties configured to maintain an electrical connection with the conductive substrate 110 when a current load on the terminal 140, 150 is less than a predetermined maximum, and sever the electrical connection with the conductive substrate 110 when the current load on the terminal 140, 150 equals or exceeds the predetermined maximum. Table 1 shows one exemplary aspect of the structural properties designed for these conditions when the predetermined maximum current load is 100 A.

which at least a portion of the fusible link system 100 will disconnect from the battery 200 (e.g., due to the melting/disintegration of one or more terminals 140, 150, 160). The melting point is a function of the electrical resistance through the terminals, which is defined by the number of terminals, terminal geometry (length, width, and thickness), and material. Further aspects may alternatively include terminals 140, 150, where both terminals 140, 150 are connected between the same peripheral side, e.g., first peripheral side 134, of the conductor 130 and the opening 120, as shown in FIGS. 6A and 6B. Thus, aspects of the present disclosure may include any number of terminals 140, 150, and/or 160 electrically connected to any portion of the periphery 122, 124, 126, 128 of the corresponding opening 120 according to any desired spacing, where the opposite end(s) of the terminal(s) connect to the conductor

TABLE 1

| Requirement | Design Rqmts. | Design Goals | Notes | Compatibility of 0.030" fusible link (in air) |
|---|---|---|---|---|
| Max operational current (cell-level) | ~9 A | ≤12 A | Based on electrical design | 9 A: 25.5° C. (78° F.) 12 A: 26.2° C. (79° F.) |
| Max impedance across fusible link | ≤3 mΩ | ≤2 mΩ | Goal is 1 mΩ | 1.25 mΩ |
| Ni 201 tab thickness | 10 mil | | Based on electrical design | |
| Fusible Link Location | Top of cell | | Allows heat rejection via cell bottom | |
| Max allowable current (cell-level) | 30 A | | Fusible link to remain functional up to this level | 40.0° C. (104° F.) |
| Fusible link activation level | 100 A | ~75-100 A | Fusible link will melt at lower current | Initial fusing current: 68 A |
| Fusible link response time | ≤1 sec | | Allowable time for link to fail at 100 A | 0.6 sec |

As shown in Table 1, a terminal 140, 150 made of Ni 201 and having a $W_t$ of 0.030" and a thickness of 10 mil meets the fusible link system requirements for this example. It will be appreciated that any combination of material, width, length, and/or thickness defines the structural properties used to meet the maximum current load requirements, and in some cases the timing requirements. As such, the terminals 140, 150 for the fusible link system 100 discussed herein may be designed for any current load and/or timing requirements. Further, it will be appreciated that each terminal 140, 150 may be designed to meet the same or different current load requirements.

While the aspects shown in FIGS. 3A and 3B and discussed above rely on two terminals 140, 150 to connect the conductor 130 to the periphery of the corresponding opening, it will be appreciated that the solution presented herein does not require two terminals. In some exemplary aspects, only one terminal 140 may be used to connect the conductor 130 to the periphery of the opening 120, as shown in FIGS. 4A and 4B. Other exemplary aspects may use more than two terminals, such as three terminals 140, 150, 160 as shown in FIGS. 5A-5B.

When multiple terminals 140, 150, and/or 160 are used to connect the conductor 130 to the periphery 122, 124, 126, 128 of the opening 120, the terminals 140, 150, and/or 160 may be arranged around the conductor 130 according to any desired configuration, including an even or an uneven distribution around the conductor 130. Such multiple terminal configurations provide the ability to fine-tune the current at which at least a portion of the fusible link system 100 will 130, or directly connect to the cell 210 or electronic system being protected from current overload, as discussed further below.

In yet other aspects, the fusible link system 100 may exclude the openings 120. For example, the fusible link system 100 may comprise only the conductive substrate 110 and one or more terminals 140 and/or 150, as shown in FIG. 7. In another example, the fusible link system 100 may comprise only the conductive substrate 110, the one or more terminals 140 and/or 150, and the corresponding conductors 130, as shown in FIG. 8.

For example, the fusible link system 100 shown in FIG. 7 comprises the conductive substrate 110 and multiple first and second terminals 140, 150, both electrically connected to the conductive substrate and extending outwardly from a surface 112 of the conductive substrate 110. Each first terminal 140 electrically connects to a corresponding portion of the electronic system being protected from current overload. For example, when the fusible link system 100 protects a battery 200 from current overload, each first terminal 140 connects to the positive contact 212 or the negative contact 214 of one of the cells 210. For aspects that further include additional terminals, e.g., second terminals 150, each pair of first and second terminals 140, 150 electrically connects to a corresponding portion of the electronic system being protected from current overload. For example, when the fusible link system 100 protects a battery 200 from current overload, each pair of first and second terminals 140, 150 connects to the positive contact 212 or the negative contact 214 of one of the cells 210. In any event, each of the terminals 140 (and 150, 160, etc.) comprises one or more structural properties configured to maintain the electrical connection with the conductive substrate 110 when a current load on the terminals is less than a predetermined maximum, and sever the electrical connection with the conductive substrate 110 when the current load on the terminal(s) 140 equals or exceeds the predetermined maximum.

The exemplary fusible link system 100 shown in FIG. 8 comprises the conductive substrate 110, one or more conductors 130 spaced from a surface 112 of the conductive substrate 110, and one or more first terminals 140 extending outwardly from a surface 112 of the conductive substrate 110 and electrically connecting the conductive substrate to the corresponding conductor 130. Each conductor 130 electrically connects to a corresponding portion of the electronic system being protected from current overload. For example, when the fusible link system 100 protects a battery 200 from current overload, each conductor 130 connects to the positive contact 212 or the negative contact 214 of one of the cells 210. For aspects that further include additional terminals, e.g., second terminals 150, each pair of first and second terminals 140, 150 electrically connects to the corresponding conductor 130. In any event, each of the terminals 140 (and 150, 160, etc.) comprises one or more structural properties configured to maintain the electrical connection between the conductor 130 and the conductive substrate 110 when a current load on the terminals is less than a predetermined maximum, and sever the electrical connection between the conductor 130 and the conductive substrate 110 when the current load on the terminal equals or exceeds the predetermined maximum.

Regardless of whether the fusible link system includes the openings of FIGS. 1-6B, or exclude the openings as shown in FIGS. 7-8, the terminal(s) 140 (and in some aspects, terminal 150 and/or terminal 160, etc.) of some aspects electrically connected to the conductive substrate are arranged in an orderly array, e.g., so as to align with each cell 210 in a battery 200. It will be appreciated, however, that such orderly array configurations are not required.

Aspects of the present disclosure further provide a method 300 of protecting a battery 200 comprising a plurality of cells 210 from a current overload. FIG. 9 shows exemplary method 300. The method 300 comprises aligning 310 a fusible link system 100 with the battery 200 to align a first contact 212, 214 of a corresponding one of the plurality of cells 210 with a corresponding first terminal 140 of the fusible link system 100 (block 310), where the fusible link system 100 comprises a conductive substrate 110 and one or more first terminals 140 electrically connected to the conductive substrate 110. The method 300 further comprises electrically connecting each of one or more first terminals 140 to the first contact 212, 214 of a corresponding one of the plurality of cells 210 (block 320). Each of the one or more first terminals 140 comprises one or more structural properties configured to maintain the electrical connection with the conductive substrate 110 when a current load on the first terminal 140 is less than a predetermined maximum, and sever the electrical connection with the conductive substrate 110 when the current load on the first terminal 140 equals or exceeds the predetermined maximum. It will be appreciated that method 300 applies for any of the above-disclosed aspects, e.g., when the fusible link system 100 includes multiple terminals 140, 150, and/or 160, when the fusible link system 100 includes openings 120, and/or when the fusible link system 100 includes conductors 130.

Aspects of the present disclosure further include various methods and processes, as described herein, implemented using various hardware configurations configured in ways that vary in certain details from the broad descriptions given above. For instance, one or more of the processing functionalities discussed above may be implemented using a general-purpose microprocessor configured with program instructions rather than dedicated hardware, depending on, e.g., the design and cost tradeoffs for the various approaches, and/or system-level requirements outside the scope of the present disclosure.

Indeed, aspects of the present disclosure can, of course, be carried out in other ways than those specifically set forth herein without departing from the essential characteristics therefrom. The aspects disclosed herein are to be considered in all respects as illustrative and not restrictive, and all changes coming within the meaning and equivalency range of the appended claims are intended to be embraced therein. In particular, although steps of particular processes or methods described herein are shown and described as being in a particular sequence or temporal order, the steps of any such processes or methods are not limited to being carried out in any particular sequence or order, absent an indication otherwise. Indeed, the steps in such processes or methods are generally carried out in various different sequences and orders according to particular aspects of the present disclosure while still falling within the scope of the present disclosure.

What is claimed is:

1. A fusible link system comprising:
   a conductive substrate; and
   one or more first terminals electrically connected to the conductive substrate;
   one or more second terminals electrically connected to the conductive substrate;
   one or more conductors spaced from the conductive substrate and each corresponding to one of the one or more first terminals and to one of the one or more second terminals;
   wherein each of the one or more first terminals comprises one or more structural properties configured to:
      maintain an electrical connection with the conductive substrate when a current load on the first terminal is less than a predetermined maximum; and
      sever the electrical connection with the conductive substrate when the current load on the first terminal equals or exceeds the predetermined maximum;
   wherein each of the one or more second terminals comprises one or more structural properties configured to:
      maintain the electrical connection with the conductive substrate when the current load on the second terminal is less than the predetermined maximum; and
      sever the electrical connection with the conductive substrate when the current load on the second terminal equals or exceeds the predetermined maximum.

2. The fusible link system of claim 1 wherein for each of the one or more conductors:
   a first end of the corresponding first terminal is electrically connected to the conductor; and
   a second opposing end of the corresponding first terminal is electrically connected to the conductive substrate.

3. The fusible link system of claim 2 wherein for each of the one or more second terminals:
   is spaced from the first terminal of the corresponding conductor;

a first end of the second terminal is electrically connected to the corresponding conductor; and a second opposing end of the second terminal is electrically connected to the conductive substrate.

4. The fusible link system of claim 3 wherein for each of the one or more first and second terminals:
the first terminal is disposed between the corresponding conductor and the conductive substrate such that:
the first end of the first terminal electrically connects to a first portion of the periphery of the corresponding conductor; and
the second opposing end of the first terminal electrically connects to a first portion of the conductive substrate; and
the second terminal is disposed between the corresponding conductor and the conductive substrate such that:
the first end of the second terminal electrically connects to a second portion of the periphery of the corresponding conductor opposite the first portion; and
the second opposing end of the second terminal electrically connects to a second portion of the conductive substrate opposite the first portion of the conductive substrate.

5. The fusible link system of claim 3 wherein for each of the one or more first and second terminals:
the first terminal is disposed between the corresponding conductor and the conductive substrate such that:
the first end of the first terminal electrically connects to a first portion of the periphery of the corresponding conductor; and
the second opposing end of the first terminal electrically connects to a first portion of the conductive substrate; and
the second terminal is disposed between the corresponding conductor and the conductive substrate and proximate the corresponding first terminal such that:
the first end of the second terminal electrically connects to the first portion of the periphery of the corresponding conductor proximate the first end; and
the second opposing end of the second terminal is electrically connected to the first portion of the conductive substrate proximate the second opposing end of the first terminal.

6. The fusible link system of claim 3 wherein the one or more structural properties of each first terminal and each second terminal comprises a material and/or a length and/or a width and/or a thickness.

7. The fusible link system of claim 2 wherein:
the conductive substrate comprises a plurality of openings;
one of the one or more conductors is disposed within a corresponding one of the plurality of openings and spaced from the periphery of the corresponding opening; and
the opposing end of the corresponding one of the one or more first terminals is electrically connected to the periphery of the corresponding one of the plurality of openings.

8. The fusible link system of claim 7 wherein each of the one or more second terminals:
is spaced from a corresponding one of the one or more first terminals;
a first end of the second terminal is electrically connected to the corresponding conductor; and
a second opposing end of the second terminal is electrically connected to the periphery of the corresponding one of the plurality of openings.

9. The fusible link system of claim 7 wherein the plurality of openings comprises a plurality of openings arranged in an orderly array in the conductive substrate.

10. The fusible link system of claim 7 wherein:
each of the plurality of openings has a rounded rectangular shape having a central length ($L_o$), a central width ($W_o$) less than the central length ($L_o$), and an arc radius (R) for side portions of the periphery at opposing ends of the central length ($L_o$); and
each of the one or more conductors has a circular shape comprising a diameter (D) less than the central width ($W_o$) of the corresponding opening.

11. The fusible link system of claim 10 wherein:
the central length ($L_o$) of each of the plurality of openings is greater than twice the diameter (D) of the corresponding conductor; and
the arc radius (R) of each opening is greater than half the diameter (D) of the corresponding conductor.

12. The fusible link system of claim 1 wherein the one or more structural properties of each first terminal comprises a material and/or a length and/or a width and/or a thickness.

13. A method of protecting a battery comprising a plurality of cells from a current overload, the method comprising:
aligning a fusible link system with the battery to align a first contact of a corresponding one of the plurality of cells with a corresponding first terminal of the fusible link system, the fusible link system comprising:
a conductive substrate comprising a plurality of openings with each of the openings comprising:
a conductor that is spaced from the conductive substrate;
one or more first terminals electrically connected to the conductive substrate and to the conductor; and
one or more second terminals electrically connected to the conductive substrate and to the conductor;
electrically connecting each of one or more of the conductors to the first contact of a corresponding one of the plurality of cells;
wherein each of the one or more first terminals comprises one or more structural properties configured to:
maintain the electrical connection with the conductive substrate when a current load on the first terminal is less than a predetermined maximum; and
sever the electrical connection with the conductive substrate when the current load on the first terminal equals or exceeds the predetermined maximum.

14. The method of claim 13 wherein electrically connecting each of the one or more first terminals comprises:
electrically connecting a first end of a corresponding one of the one or more first terminals to a corresponding one of the one or more conductors; and
a second opposing end of the corresponding one of the one or more first terminals is electrically connected to the conductive substrate.

15. The method of claim 14 wherein each of the second terminals is spaced from a corresponding one of the one or more first terminals, the method further comprising:
electrically connecting each of the one or more second terminals to the first contact of the corresponding one of the plurality of cells by electrically connecting a first end of the second terminal to the corresponding conductor, wherein an opposing end electrically connects to the conductive substrate;
wherein each of the one or more second terminals comprises one or more structural properties configured to:

maintain the electrical connection with the conductive substrate when the current load on the second terminal is less than the predetermined maximum; and sever the electrical connection with the conductive substrate when the current load on the second terminal equals or exceeds the predetermined maximum.

16. The method of claim 15 wherein electrically connecting the first and second terminals to the corresponding conductor comprises:

electrically the connecting a first end of the first terminal to a first portion of the periphery of the corresponding conductor; and the second opposing end of the first terminal is electrically connected to a first portion of the conductive substrate; and electrically connecting the first end of the second terminal to a second portion of the periphery of the corresponding conductor opposite the first portion of the periphery of the corresponding conductor; and the second opposing end of the second terminal is electrically connected to a second portion of the conductive substrate opposite the first portion of the conductive substrate.

17. The method of claim 15 wherein electrically connecting the first and second terminals to the corresponding conductor comprises:

electrically the connecting the first end of the first terminal to a first portion of the periphery of the corresponding conductor; and the second opposing end of the first terminal is electrically connected to a first portion of the conductive substrate; and electrically connecting the first end of the second terminal to the first portion of the periphery of the corresponding conductor proximate the first end of the first terminal; and the second opposing end of the second terminal is electrically connected to the first portion of the conductive substrate proximate the second opposing end of the first terminal.

18. The method of claim 14 wherein:

electrically connecting each of the one or more first terminals further comprises electrically connecting the opposing end of the corresponding one of the one or more first terminals to a periphery of the corresponding opening.

19. The method of claim 18 further comprising configuring the plurality of openings such that:

each of the plurality of openings has a rounded rectangular shape having a central length ($L_o$), a central width ($W_o$) less than the central length ($L_o$), and an arc radius (R) for side portions of the periphery at opposing ends of the central length ($L_o$);

each of the one or more conductors has a circular shape comprising a diameter (D), wherein the central width ($W_o$) of each of the plurality of openings is greater than the diameter (D) of the corresponding conductor; and the arc radius (R) of each opening is greater than half the diameter (D) of the corresponding conductor.

20. The method of claim 13 further comprising arranging the openings that are aligned in an orderly array on the conductive substrate relative to the battery.

* * * * *